June 6, 1950     F. E. ROSS     2,510,419
HIGH MAGNIFICATION PROJECTION SYSTEM
Filed Oct. 11, 1948
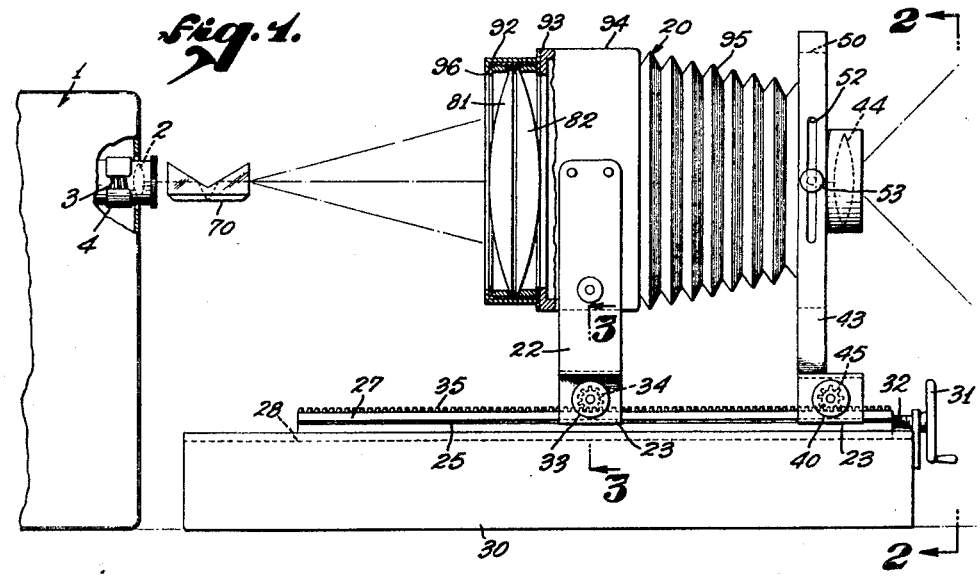
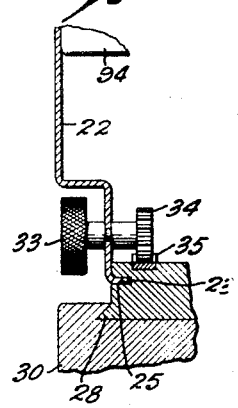
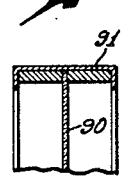
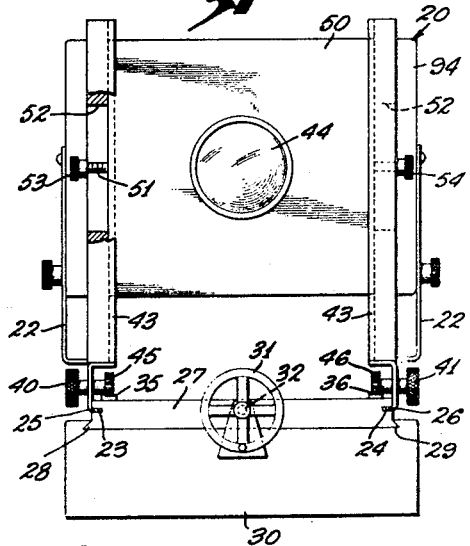
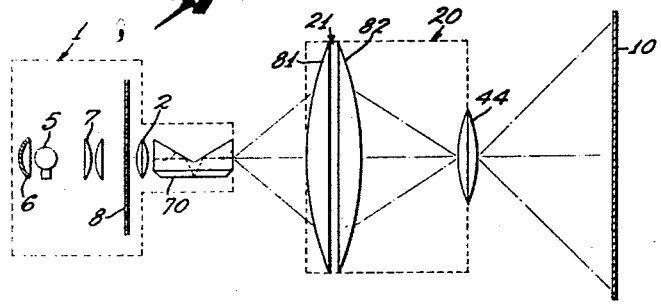
FRANK E. ROSS,
INVENTOR.
BY W. E. Beatty
ATTORNEY.

Patented June 6, 1950

2,510,419

UNITED STATES PATENT OFFICE 2,510,419

HIGH MAGNIFICATION PROJECTION SYSTEM

Frank E. Ross, Altadena, Calif., assignor to Harrold M. Custer, Los Angeles, Calif.

Application October 11, 1948, Serial No. 53,816

4 Claims. (Cl. 88—24)

The invention relates to a re-projector and more particularly to means for projecting a comparatively large image on a screen with a relatively short throw or in a relatively short distance.

More particularly the invention relates to a re-projector wherein a picture from a slide or from a motion picture film is projected with a comparatively small magnification to a focal plane, with a second projection lens having that focal plane at its back focus for re-projecting the picture with large magnification.

If a translucent screen is employed at the above mentioned focal plane, that is, at the front focus of the first projection lens and at the back focus of the second projection lens, such screen disperses and wastes a substantial amount of light resulting in a decrease in the brightness of the final picture, particularly at the margin.

An object of the invention is to increase the brightness of the picture, and this is accomplished by employing a positive lens or lenses at the above mentioned focal plane. This lens may be called a field lens and, as it is at a focal plane, it does not modify the magnification of the system but it does increase the brightness of the projected picture particularly at the edge of the field, by diverting into the second projection lens those image rays which would otherwise be lost due to dispersion when a screen is used.

Another object of the invention is to facilitate locating the above mentioned focal plane for proper location of the field lens. This is accomplished by temporarily employing a translucent screen to locate the focal plane there by relatively moving the screen and the two projection lenses, whereupon the screen is removed and the field lens or lenses substituted therefor.

For further details of the invention reference may be made to the drawings wherein Fig. 1 is a side view in elevation partly in section of a conventional projector, with a field lens and re-projector carrying out the present invention.

Fig. 2 is an end view in elevation, partly in section on line 2—2 of Fig. 1 looking in the direction of the arrows.

Fig. 3 is an enlarged partial sectional view on line 3—3 of Fig. 1 looking in the direction of the arrows.

Fig. 4 is a schematic diagram of the optical arrangement in Fig. 1.

Fig. 5 is an enlarged fragmentary sectional view of the slide mount for the ground glass.

Fig. 6 is a sectional view corresponding to Fig. 5 with a modified type of field lens.

Referring in detail to the drawings, the projector 1 represents a conventional projector for slides or motion picture film. If slides are employed, they may be inverted to obtain an erect image projected by objective lens 44 on the screen 10 indicated in Fig. 4. If the usual motion picture projector is employed for the projector indicated at 1, the image may be erected by employing an erector prism 70, for example of the Brashear-Hastings type, although other types of image inverters may be employed. The inverter 70 has a suitable mount not shown and it is arranged close to the objective lens 2 of the projector 1. The objective 2 is adjustable for focusing purposes and, for example, the lens 2 may have a lens barrel having a spiral groove 3 cooperating with a ball not shown in the lens support 4, although other types of adjustment may be employed.

As shown in Fig. 4 the projector 1 has a lamp 5, preferably of high intensity, reflector 6, condenser lens 7 and the transparent picture medium 8 which may be motion picture film in the case of a motion picture projector, or it may be one frame of a film, or a glass slide in the case of a still projector.

If the picture projected by projector 1 were focused directly to a screen 10, see Fig. 4, it would be necessary to have projector 1 at a comparatively great distance from projection screen 10 which can be either opaque or translucent. For example, if the picture medium 8 is 35 mm. film, to produce an image 30 feet in width on screen 10, screen 10 must be in the neighborhood of 170 feet from the projector. This is wasteful of space, particularly, in a motion picture studio where pictures are projected on to translucent screens for process shots and if such long projection throws were not required, the stage space could be used for stage settings or for other purposes. According to the present invention, a large saving is made in this projection throw with improved light efficiency as follows. If a 35 mm. movie film is to be enlarged on screen 10 with a relatively short throw, and assuming that the focal length of projector 1 is 5 inches, its focus is adjusted, for example, to project an aerial image say 40 inches in front of projector 1. The inverter 70 is used or not, as above described. The aerial image produced by the objective 2 is picked up by and is arranged at the back focus of the projection lens 44. For example, the back focal length of the projection lens 44 may be 12 inches. Assuming that the horizontal width of the negative image on the picture 8 is 22 mm. or 0.87 inch, then the width of the aerial image will be eight times this or about 7 inches. If the image projected on screen 10 is to be the same as in the other case, namely 30 feet, then the screen 10 will be only 51 feet from the projection lens 44 instead of 170 feet as in prior practice. This is accomplished with increased intensity of the picture on screen 10 as follows. The picture 8 appears with initial magnification as the aerial image at the locus of 21, and the front projection lens 44 gives further magnification at screen 10. A positive lens, here called a field lens, as indicated at 21 in Fig. 4 is arranged at or near the aerial image produced by the lens 2 and at the back focus of lens 44 which is in a focal plane common to both the projection lenses 2 and 44. As shown in Fig. 6, the field lens 21 may be a single double convex lens. As shown in Fig. 1, the field lens may be two condenser lenses indicated at 81, 82, each being plano-convex, with their plane surfaces face to face and nearly or not quite in contact. The aerial image from objective 2 is positioned midway between the lenses 81 and 82 or at the median plane of the single lens indicated at 21 in Fig. 6.

The focal plane common to projection lenses 2 and 44 is determined by casting the aerial image of the picture 8 onto screen 90, see Fig. 5, which may be of ground glass or other translucent material. Screen 90 is centrally mounted in a slide 91 which slides laterally into a holder 92 suitably mounted at the rear 93 of a rectangular frame 94. The front of frame 94 is connected by a bellows 95 to the lens board 50. The lenses 81, 82 are centrally mounted in a similar slide 96 and the single field lens 21 is centrally mounted in a similar slide 97.

The proper location of the field lens is conveniently determined as follows:

When screen 90 is in place in the holder 92, the position of this screen can be adjusted as it is carried by a carriage 22 having inwardly extending feet 23 and 24 which slide in grooves 25 and 26, respectively, in a base slide 27. The slide 27 has a sliding dovetail connection 28, 29 with the base 30. By operating hand wheel 31 which has a screw 32 and a nut connection not shown with slide 27, slide 27 can be moved back and forth to vary the position of the re-projector 20 as a whole. The position of screen 90 can be separately adjusted by operating knob 33 on carriage 22. Knob 33 has a pinion 34 which engages with a rack 35 on the slide 27. On the side opposite to that shown in Fig. 1, carriage 22 has another knob like 33 to operate a pinion like 34 for a parallel rack 36 shown in Fig. 2. The knob 33, and its companion at the other side of mount 22, do not appear in Fig. 2 as this is a front view. The two knobs 40 and 41 shown in Fig. 2 are in the mount of carriage 43 for the objective lens 44. Knob 40 operates a pinion 45 which operates on the rack 35 and knob 41 operates a pinion 46 on the rack 36. By operating the knobs 40 and 41, the objective lens 44 can be individually moved back and forth. Projector 1 can be moved back and forth also, hence any desired adjustment can be obtained. The opposite sides of lens board 50 have bolts like 51 which operate in slots like 52 in the mount 43. Each bolt like 51 has a nut like 53 to clamp the board 50 in its adjusted elevated position to frame the picture on screen 10. The companion nut for 53 is shown at 54 in Fig. 2.

After lenses 2 and 44 and screen 90 have been relatively adjusted to focus the aerial image of picture 8 on screen 90 with the picture in focus and of the desired size on screen 10, the screen 90 is removed, and the field lens 21 or 81, 82 is substituted therefor in the holder 92.

The field lens 21 or 81 and 82 may, for example, be about 12 inches in diameter and the size of the aerial image projected thereon by projection lens 2 may be about 7 inches by 9 inches.

The increase in illumination of the picture projected on screen 10, when using a field lens instead of a translucent screen for the aerial image is shown by the following test. A 35 mm. still film was used at 8 in Fig. 4, with a comparatively low intensity lamp, i. e., 150 watt lamp, at 5. When using a ground glass at 21, the picture projected on screen 10 was so low in intensity that a reading could not be obtained on a photometer. The ground glass was removed and a field lens in the form of two 14 inch diameter condenser lenses was substituted therefor as indicated at 81, 82 in Fig. 5 and the light intensity of the picture on screen 10 was then two and one-half foot candles, the other elements in the system being the same. In this case the size of the aerial image was about 8 inches by 10 inches and the picture projected on screen 10 was about 12 feet by 14 feet with a projection throw, that is distance from projector 1 to screen 10, of about 16 feet.

Various other modifications may be made in the invention without departing from the spirit of the following claims. Either, or both of the lenses 2 and 44 may be wide angle lenses. Also, screen 10 may be translucent or opaque, e. g., for process shots or for front projection.

I claim:

1. Optical apparatus comprising a picture projector, and means for obtaining for said projector a shorter projection throw than that required for direct projection from said projector to a screen, said means comprising a projection lens for said projector for projecting an aerial image of the picture with magnification, a second projection lens for projecting said image on a screen displaying that image with further magnification wherein the picture area at said screen is at least several hundred times greater than the area of said aerial image, and a positive field lens between said projection lenses and arranged substantially at the locus of said aerial image for increasing the brightness of the picture on said screen, a slide, rack means on said slide, an adjustable support having a pinion cooperating with said rack means for adjusting said field lens as a unit, an independent adjustable support having a pinion engageable with said rack means for independently adjusting said second projection lens, and means for operating said slide.

2. Optical apparatus comprising a picture projector, and means for obtaining for said projector a shorter projection throw than that required for direct projection from said projector to a screen, said means comprising a projection lens for said projector for projecting an aerial image of the picture with magnification, a second projection lens for projecting said image on a screen displaying that image with further magnification wherein the picture area at said screen is at least several hundred times greater than the area of said aerial image, a positive field lens between said projection lenses and arranged substantially at the locus of said aerial image for increasing the brightness of the picture on said screen, said field lens comprising positive lens elements closely arranged back to back substantially in contact, and means for adjusting said field lens as a unit relatively to said projection lenses.

3. Optical apparatus comprising a picture projector, and means for obtaining for said projector a shorter projection throw than that required for direct projection from said projector to a screen, said means comprising a projection lens for said projector for projecting an aerial image of the picture with magnification, a second projection lens for projecting said image on a screen displaying that image with further magnification wherein the picture area at said screen is at least several hundred times greater than the area of said aerial image, a positive field lens between said projection lenses and arranged substantially at the locus of said aerial image for increasing the brightness of the picture on said screen, said field lens comprising positive lens elements closely arranged back to back substantially in contact, and an erection prism between the projection lens of said projector and said field lens.

4. Optical apparatus comprising a picture projector, and means for obtaining for said projector a shorter projection throw than that required for direct projection from said projector to a screen, said means comprising a projection lens for said projector for projecting an aerial image of the picture with magnification, a second projection lens for projecting said aerial image on a screen displaying that image with further magnification wherein the picture area at said screen is at least several hundred times greater than the area of said aerial image, and a positive field lens between said projection lenses and arranged substantially at the locus of said aerial image for increasing the brightness of the picture on said screen, said field lens comprising two positive plano-convex lens elements closely arranged with the plano-surfaces in back to back relationship and substantially in contact.

FRANK E. ROSS.

REFERENCES CITED

The following references are of record in the file of this patent:

UNITED STATES PATENTS

| Number | Name | Date |
| --- | --- | --- |
| 994,276 | Reilly | June 6, 1911 |
| 1,199,943 | Taylor | Oct. 3, 1916 |
| 1,687,030 | Mitchell | Oct. 9, 1928 |
| 1,783,998 | Chretien | Dec. 9, 1930 |
| 1,931,228 | Kitroser | Oct. 17, 1933 |
| 2,391,430 | Macek | Dec. 25, 1945 |